(12) United States Patent
Vidal et al.

(10) Patent No.: US 8,762,931 B2
(45) Date of Patent: Jun. 24, 2014

(54) GENERATING AN ENCODED PACKAGE PROFILE

(75) Inventors: Seth Kelby Vidal, Raleigh, NC (US); James Antill, Bristol, CT (US)

(73) Assignee: Red Hat, Inc., Raleigh, NC (US)

(*) Notice: Subject to any disclaimer, the term of this patent is extended or adjusted under 35 U.S.C. 154(b) by 947 days.

(21) Appl. No.: 12/788,139

(22) Filed: May 26, 2010

(65) Prior Publication Data
US 2011/0296394 A1 Dec. 1, 2011

(51) Int. Cl.
*G06F 9/44* (2006.01)

(52) U.S. Cl.
USPC ............ 717/101; 717/121; 717/131; 717/173

(58) Field of Classification Search
CPC ............... G06F 8/20; G06F 8/61; G06F 8/71
See application file for complete search history.

(56) References Cited

U.S. PATENT DOCUMENTS

| | | | |
|---|---|---|---|
| 6,438,749 B1 | 8/2002 | Chamberlain | |
| 6,578,113 B2 | 6/2003 | Krishnamurthy et al. | |
| 7,194,730 B2 * | 3/2007 | Pramberger | 717/120 |
| 7,240,336 B1 | 7/2007 | Baker | |
| 7,472,353 B1 | 12/2008 | Wolff et al. | |
| 7,512,939 B2 | 3/2009 | Brookner | |
| 7,530,065 B1 * | 5/2009 | Ciudad et al. | 717/174 |
| 7,624,393 B2 | 11/2009 | Egan et al. | |
| 7,657,885 B2 | 2/2010 | Anderson | |
| 7,693,962 B2 | 4/2010 | Serlet et al. | |
| 7,694,294 B2 * | 4/2010 | Bukovec et al. | 717/173 |
| 7,836,341 B1 | 11/2010 | Krishnan | |
| 7,984,420 B2 * | 7/2011 | Eldridge et al. | 717/108 |
| 8,019,725 B1 * | 9/2011 | Mulligan et al. | 717/176 |
| 8,028,272 B2 * | 9/2011 | Eldridge et al. | 717/110 |
| 8,060,862 B2 * | 11/2011 | Eldridge et al. | 717/121 |
| 8,209,564 B2 * | 6/2012 | Vidal et al. | 714/38.1 |
| 8,225,271 B2 * | 7/2012 | Eldridge et al. | 717/101 |
| 8,407,669 B2 * | 3/2013 | Yee et al. | 717/120 |
| 2002/0087966 A1 * | 7/2002 | Wiginton et al. | 717/174 |
| 2002/0156839 A1 | 10/2002 | Peterson et al. | |
| 2002/0170052 A1 * | 11/2002 | Radatti | 717/171 |
| 2003/0051235 A1 | 3/2003 | Simpson | |
| 2003/0229890 A1 | 12/2003 | Lau et al. | |

(Continued)

OTHER PUBLICATIONS

Seth Kelby Vidal, "Systems and Methods for Initiating Software Repairs in Conjuction with Software Package Updates", U.S. Appl. No. 12/714,200, filed Feb. 26, 2010.

(Continued)

*Primary Examiner* — Thuy Dao
(74) *Attorney, Agent, or Firm* — Lowenstein Sandler LLP

(57) ABSTRACT

Generation of cached representations of an encoded package profile. A physical or virtual client machine can host a set of installed software packages, including operating system, application, and/or other software. A package manager installed on the client machine can track the installed package complement, and updates available for those packages. The package manager can be configured to capture attributes of the set of installed packages, and generate an encoded identification of the installed packages using a hash or other algorithm. The encoded identification can be transmitted to one or more package servers or other management platform. The package server(s) can receive and decode the identifier, and insert that identifier and other package-related data into a local package cache. The package server(s) or other platform can configure package update or other activity using the cached representation of package profiles for one or more client machines.

21 Claims, 5 Drawing Sheets

| MACHINE ID | ENCODED ID OF INSTALLED PACKAGES | PACKAGE INSTALLATION DATE/TIME | PACKAGE SIZE | PACKAGE INSTALLATION LOCATION | PACKAGE UPDATE NOTIFICATION RECORD | PACKAGE UPDATE SCHEDULED | | OTHER ATTRIBUTES |
|---|---|---|---|---|---|---|---|---|
| MACHINE ID1 | 1Z366TM | 5/2/10 1:00 | 6.2 MB | C:/LIBRARY1 | N | Y: PKG 1280 | | |
| MACHINE ID1 | 1Z366TM | 5/2/10 3:00 | 6.2 MB | C:/LIBRARY1 | Y | Y: PKG 1280 | | |
| MACHINE ID1 | 1Z366TM | 5/3/10 5:00 | 6.2 MB | C:/LIBRARY3 | N | Y: PKG 1280 | | |
| MACHINE ID1 | 7X212BD | 4/18/10 11:00 | 1.5 MB | D:/LIBRARY6 | Y | Y: PKG 1280 | | |
| MACHINE ID1 | 7X212BD | 4/19/10 7:30 | 1.5 MB | E:/DIRECTORY1 | Y | Y: PKG 1280 | | |
| MACHINE ID1 | 9N336DF | 12/2/09 2:15 | 8.0 MB | G:/DIRECTORY7 | N | Y: PKG 1280 | | |
| MACHINE X | | | | | | | | |

180 — PACKAGE CACHE RECORD 182

(56) References Cited

U.S. PATENT DOCUMENTS

| | | | |
|---|---|---|---|
| 2004/0181790 A1* | 9/2004 | Herrick | 717/168 |
| 2005/0076087 A1 | 4/2005 | Budd et al. | |
| 2005/0132357 A1* | 6/2005 | Shell et al. | 717/174 |
| 2005/0210459 A1 | 9/2005 | Henderson et al. | |
| 2006/0107062 A1 | 5/2006 | Fauthoux | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |
| 2008/0141240 A1 | 6/2008 | Uthe | |
| 2008/0201705 A1 | 8/2008 | Wookey | |
| 2008/0215796 A1* | 9/2008 | Lam et al. | 711/100 |
| 2009/0013319 A1 | 1/2009 | Williams et al. | |
| 2009/0037897 A1 | 2/2009 | Dull et al. | |
| 2009/0144719 A1* | 6/2009 | Pazdziora | 717/168 |
| 2009/0249215 A1* | 10/2009 | Paek | 715/740 |
| 2009/0300149 A1* | 12/2009 | Ferris et al. | 709/222 |
| 2009/0300595 A1 | 12/2009 | Moran et al. | |
| 2009/0300641 A1* | 12/2009 | Friedman et al. | 718/104 |
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2010/0313196 A1* | 12/2010 | De Atley et al. | 717/174 |
| 2011/0131564 A1* | 6/2011 | Vidal et al. | 717/174 |
| 2011/0131565 A1* | 6/2011 | Vidal et al. | 717/175 |
| 2011/0131566 A1* | 6/2011 | Vidal et al. | 717/175 |
| 2011/0214114 A1* | 9/2011 | Vidal et al. | 717/170 |
| 2011/0214118 A1* | 9/2011 | Antill et al. | 717/174 |
| 2011/0265073 A1* | 10/2011 | Vidal et al. | 717/170 |
| 2011/0265074 A1* | 10/2011 | Vidal et al. | 717/171 |
| 2011/0265080 A1* | 10/2011 | Matthew et al. | 717/176 |
| 2011/0289495 A1* | 11/2011 | Mulligan et al. | 717/168 |
| 2011/0296390 A1* | 12/2011 | Vidal et al. | 717/168 |
| 2011/0296393 A1* | 12/2011 | Vidal et al. | 717/171 |
| 2011/0296394 A1 | 12/2011 | Vidal et al. | |
| 2011/0296395 A1* | 12/2011 | Vidal et al. | 717/171 |
| 2011/0296397 A1* | 12/2011 | Vidal et al. | 717/171 |
| 2012/0079471 A1* | 3/2012 | Vidal et al. | 717/169 |

OTHER PUBLICATIONS

Seth Kelby Vidal, "Systems and Methods for Diagnostic Notification Via Package Update Manager", U.S. Appl. No. 12/714,258, filed Feb. 26. 2010.

Seth Kelby Vidal, "Systems and Methods for Managing Software Package Updates Using Communication Pipes", U.S. Appl. No. 12/714,208, fled Feb. 26, 2010.

Seth Kelby Vidal, "Systems and Methods for Generating and Storing Translation Information As Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal. "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kilby Vidal, "Systems and Methods for Automatic Upgrade and Downgrade in Package Update Operations", U.S. Appl. No, 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

| MACHINE ID | ENCODED ID OF INSTALLED PACKAGES | PACKAGE INSTALLATION DATE/TIME | PACKAGE SIZE | PACKAGE INSTALLATION LOCATION | PACKAGE UPDATE NOTIFICATION RECORD | PACKAGE UPDATE SCHEDULED | OTHER ATTRIBUTES |
|---|---|---|---|---|---|---|---|
| MACHINE ID1 | 1Z366TM | 5/2/10 1:00 | 6.2 MB | C:/LIBRARY1 | N | Y: PKG 1280 | |
| MACHINE ID1 | 1Z366TM | 5/2/10 3:00 | 6.2 MB | C:/LIBRARY1 | Y | Y: PKG 1280 | |
| MACHINE ID1 | 1Z366TM | 5/3/10 5:00 | 6.2 MB | C:/LIBRARY3 | N | Y: PKG 1280 | |
| MACHINE ID1 | 7X212BD | 4/18/10 11:00 | 1.5 MB | D:/LIBRARY6 | Y | Y: PKG 1280 | |
| MACHINE ID1 | 7X212BD | 4/19/10 7:30 | 1.5 MB | E:/DIRECTORY1 | Y | Y: PKG 1280 | |
| MACHINE ID1 | 9N336DF | 12/2/09 2:15 | 8.0 MB | G:/DIRECTORY7 | N | Y: PKG 1280 | |
| ... | | | | | | | |
| MACHINE X | | | | | | | |

FIG. 3

GENERATING AN ENCODED PACKAGE PROFILE

FIELD

The present teachings relate to systems and methods for generating cached representations of an encoded package profile, and more particularly, to platforms and techniques for capturing the attributes of a set of installed packages on each host or client machine in a managed network, generating and transmitting an encoded identification of that package complement to a package server, and configuring package update or other activity based on the cached representations of the host machines.

BACKGROUND OF RELATED ART

Users of physical or virtual machines commonly install software packages, including package updates, to those machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set.

Software package managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories and associated package servers, to directly connect to those databases and download available package updates.

The process of managing package installations and initiating software package updates can involve, however, a significant degree of processing overhead, including when the managed network in which the host or client machines are installed is large. In those and other cases, tracking the package complement on each host machine can involve a significant amount of storage, and/or a significant amount of communications overhead. In such conditions, the package server and/or other remote management platform may have to track, interrogate, send commands, or distribute downloads to thousands, hundreds of thousands, or greater numbers of host machines, so that querying or interrogating each machine or groups of machines can require a significant amount of bandwidth and time. In those large-scale and other network architectures, it would be advantageous to be able to consult a local or high-speed storage record of the package complements installed on a machine or groups of machines, without a need to communicate with those machines directly, and without a need to generate reports from a package repository each time an update or other management task is desired. It may be desirable to provide systems and methods for generating cached representations of an encoded package profile, in which a package server or other management platform can capture encoded identifications of package installations from client machines, and store those encoded package identifications to a local cache memory for rapid access for use in package updating, inventorying, and/or other management activities.

DESCRIPTION OF DRAWINGS

The accompanying drawings, which are incorporated in and constitute a part of this specification, illustrate embodiments of the present teachings and together with the description, serve to explain the principles of the present teachings. In the figures:

FIG. 3 illustrates an exemplary data structure, for a package cache record that can be used to store data related to package installations on one or more clients, according to various embodiments;

DESCRIPTION OF EMBODIMENTS

Figure 1:
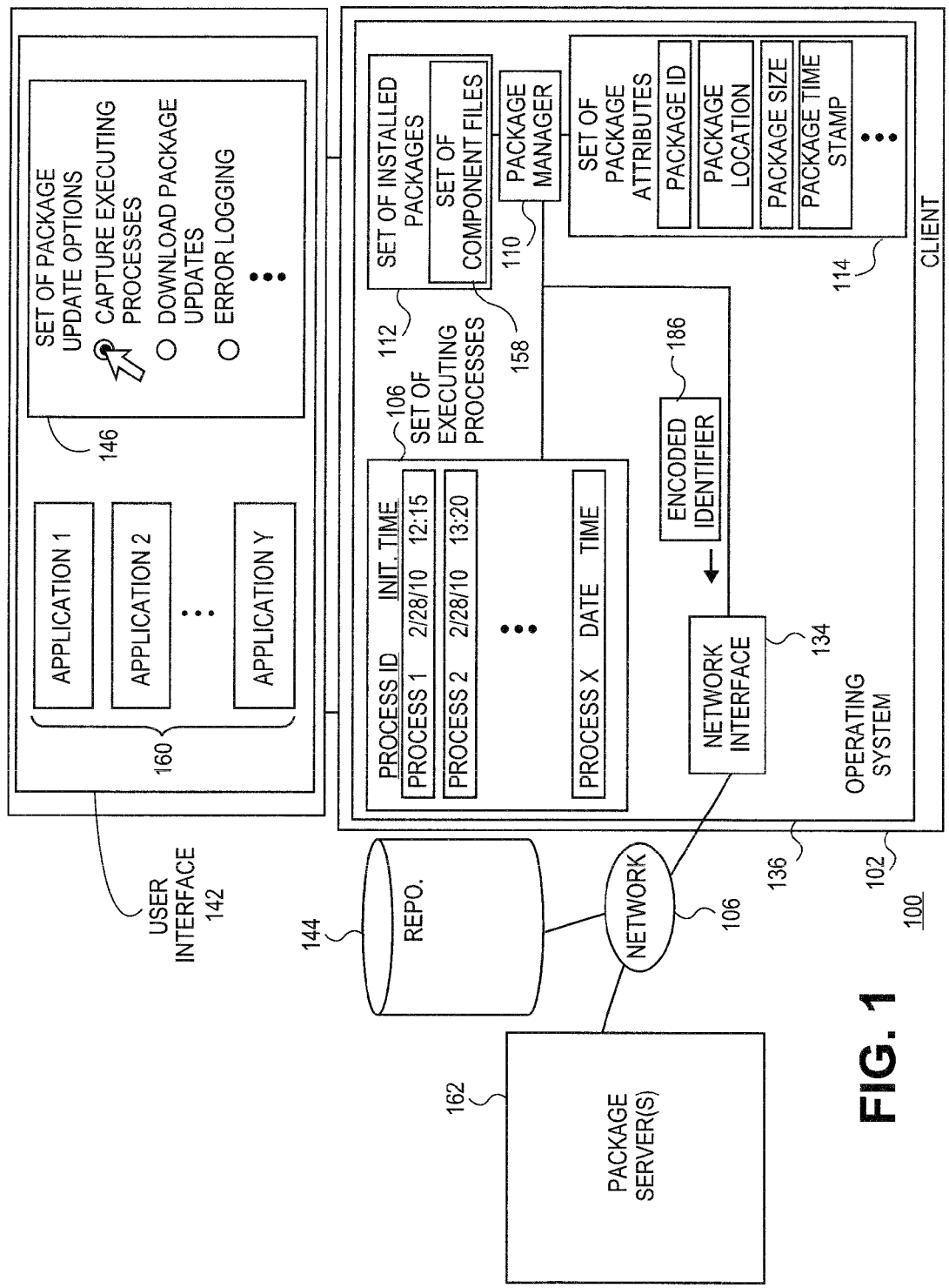
FIG. 1 illustrates an overall network in which systems and methods for generating cached representations of an encoded package profile can be implemented, according to various embodiments.

Embodiments of the present teachings relate to systems and methods for generating cached representations of an encoded package profile. More particularly, embodiments relate to platforms and techniques for generating cached representations of an encoded package profile. A package server and/or other remote management platform can receive an encoded identification of the set of installed packages hosted on a client or host machine. The encoded identification can be or include a hashed representation of the set of installed packages on a given target or client, based on the package names, file names, installation dates and times, sizes, and/or other attributes of the set of installed packages. The encoded identification can be transmitted to a set of one or more remote package servers which manages the package installations for the client or host machines in a managed network. The one or more remote package servers and/or other remote management platform or logic can store the encoded identifications for the managed machines in a package cache record stored in a local high-speed package cache, such as high-speed electronic memory and/or other cache memory or storage. The one or more package servers can store the encoded identifications and associated package data in the package cache record, keyed on machine IDs or other fields, and sort or order the information based on machines having matching identifiers and therefore, the same package installation image. The one or more package servers or other platform can then directly access the package cache record to determine the package complement, update status, and/or other aspects of the machine state of the subject machines, rather than interrogating the one or more clients across the managed network. The one or more clients can, in aspects, transmit a package update notification to the one or more package servers when updates are received or installed, to trigger cache updates to the encoded identifiers or otherwise maintain cache coherency. When target machines are identified in the package cache record, the one or more package servers can distribute package updates to the client machines. In aspects, on each client machine, a local package manager can track and manage the installation of one or more software packages and/or updates to those packages (which may be referred to together as a "software package update") on those client, host, target, and/or other machines. These and other embodiments described herein address the various noted shortcomings in known package update technology, and provide a user with enhanced package and system management capability for inventorying, encoding, tracking updating, and managing their software package resources with more storage and processing efficiency, including less need for exchanges across the network to inventory client package sets, as well as to perform additional management and configuration functions with enhanced capabilities.

Reference will now be made in detail to exemplary embodiments of the present teachings, which are illustrated in the accompanying drawings. Where possible the same reference numbers will be used throughout the drawings to refer to the same or like parts.

FIG. 1 illustrates an exemplary managed network 100 in which systems and methods for generating cached representations of an encoded package profile can be implemented, according to various embodiments. In embodiments as shown, in the managed network 100 a set of one or more clients 102 can store, execute, and otherwise host a variety of resources including a package manager 110 configured to communicate with a set of installed packages 112, and other hardware, software, and resources. In embodiments, the package manager 110 can be or include a software application, a utility, an application programming interface (API) to an operating system 136 of the one or more clients 102, a service, and/or other local or remote logic or resources. According to embodiments, the package manager 110 can access and manage the set of installed packages 112 to run, edit, update, inventory, configure, and otherwise manage the one or more software packages 112 hosted or installed in the one or more clients 102. In aspects, the package manager 110 can be or include one or more commercially and/or publicly available package manager applications or resources, such as the "yum" package manager available from Red Hat, Inc., Raleigh, N.C., based on or compatible with the Red Hat package manager (rpm) platform also available from Red Hat, Inc., or others.

In aspects, each package in the set of installed packages 112 can include a set of component files 158, such as executable files and/or other files or resources. In aspects, the set of component files 158 of the set of installed packages 112 can contain executable files for, or otherwise support or be associated with, a set of applications 174 installed on the one or more clients 102. In aspects, the set of applications 174 can be or include types of applications or other software, such as, for example, messaging applications, database applications, media applications, spreadsheet or modeling applications, social networking applications, word processing applications, and/or other applications or utilities, and can in aspects include an operating system, drivers, and/or components thereof. The set of installed packages 112, and/or the set of component files 158 of those packages, can have an associated set of package attributes 114 which reflects or records the file names, versions, dates, storage sizes, software requirements, an/or other attributes related to the software packages including their updates installed on the one or more clients 102, and reflected in the set of installed software packages 112.

In aspects, the package manager 110 can communicate with a network interface 134 configured to connect to one or more networks 106, such as the public Internet or other public or private networks. The package manager 110 can thereby connect to one or more package servers 162 and associated one or more package repositories 144 hosting a set of software packages including application package updates, and/or other software related to packages and their associated resources.

In aspects, the package manager 110 can interact with the set of installed packages 112 and one or more package servers 162 and associated one or more package repositories 144 to inspect, inventory, encode, configure, test, update, and/or otherwise manage the set of installed packages 112 operating on the one or more clients 102. The package manager 110 can, for example, provide a user with a set of package update options 146 displayed via a user interface 142, such as a graphical user interface or others, to select various test, configuration, and/or other management activities on the set of installed packages 112. The set of package update options 146 can include options such as one or more selections to select packages for inventorying, installation and/or update, installation options, and/or other options or parameters for the downloading of package updates from the one or more package servers 162 and their associated one or more package repositories 144 to the set of installed packages 112.

In aspects, the package manager 110 can access set of installed packages 112, and/or set of component files 158 of those packages, to generate an encoded identifier 186 of the set of installed packages 112. In aspects, the encoded identifier 186 can be based on, encoded, or derived from the set of package attributes 114 package of the set of installed packages 112, the set of component files 158, and/or other data. The encoded identifier 186 can, in aspects, be generated by applying a hash function to the set of package attributes 114, such as by applying a hash function to the package name, file name, package or file size, installation date/time, installation location, and/or other data associated with the set of installed packages 112. The encoded identifier 186 can thereby be generated as an alphanumeric string representing the package complement present and installed in the one or more clients 102. Other encoding algorithms, data, fields, formats, or information can be captured, performed, and/or encoded in the encoded identifier 186. Once captured and generated, the package manager 110 can transmit the encoded identifier 186 to the one or more package servers 162 via the one or more networks 106.

Figure 2:
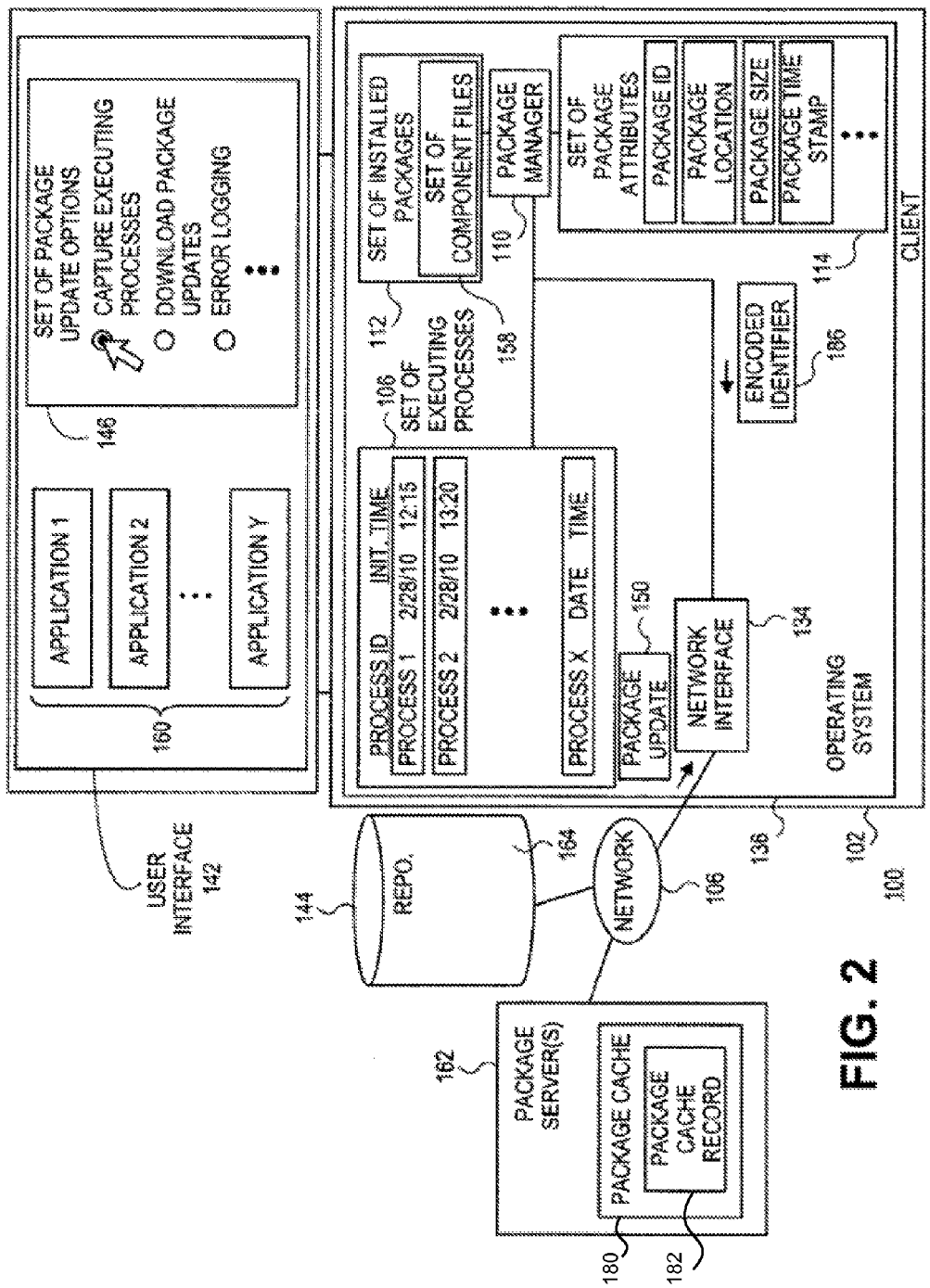
FIG. 2 illustrates an overall network in which for systems and methods for generating cached representations of an encoded package profile can be implemented, according to various embodiments in further regards.

As illustrated for example more particularly in FIG. 2, the one or more package servers 162 can receive the encoded identifier 186 from each of the one or more clients 102 in the managed network 100. The one or more package servers can place the encoded identifier 186 from each of the one or more clients 102 in a package cache record 182 stored in a package cache 180. In aspects, the package cache 180 can be or include high-speed electronic memory, such as random access memory (RAM) or static random access memory (SRAM), and/or other memory, storage or media. In aspects, the package cache 180 can be installed or hosted in the one or more package servers 162, themselves, for instance, via a system bus connected to a processor in the one or more package servers 162. In aspects, the package cache 180 can have a faster access time and/or lower latency for data access than the one or more repositories 144. In aspects, the one or more repositories 144 can, as noted, store package updates and/or other software or code, for instance in a database or other data store. By accessing the package cache record 182 stored in the comparatively high-speed memory or storage of the package cache 180, the one or more package servers 162 can identify, order, and manage the one or more clients 102 in the managed network in various aspects, without having to access the one or more repositories 144 and/or incurring the overhead of communicating with the one or more clients 102 to extract all necessary information for package updates or other management activities.

Thus, for instance, the one or more package servers 162 can access the package cache record 182 to determine which of the one or more clients 102 in the managed network 100 currently hosts or has installed a certain package, such as "Package jjk3q45af1de3a45ta28," which may be encoded in the encoded identifier 186 as "Package 14" or other identifier. Those machines currently hosting that package in the set of installed packages can be scheduled to receive a package update 150, such as an update of that package to the next available update version of that package. The one or more package servers 162 can then initiate the distribution and installation of the package update 150 to the one or more machines 102 having that matching encoded identifier 186 using files extracted from the one or more repositories 144, and/or other sources of package data. In aspects, in conjunction with package update activities and for other reasons, the package manager 110 of the one or more clients 102 can be configured to generate a package update notification 188 each time a subject machine receives and installs a package update. The package manager 110 can be configured to transmit the package update notification 188 to the one or more package servers 162 at the time of any package update, and/or at other times. According to embodiments, receipt of the package update notification 188 from the one or more clients 102 can indicate to the one or more package servers 162 that the subject client or host has changed state in terms of its set of installed packages 112. The one or more package servers 162, to maintain data coherency or currency, may then interrogate the one or more clients 102 to request an updated encoded identifier 186 for the set of installed packages 112 on that machine. The one or more package servers 162 can be configured to delay any update activity until all of the one or more clients 102 reporting a package update notification 188 have been queried, inventoried, and have transmitted an updated encoded identifier 186 with the most recent set of installed packages 112 reflected in the encoded identifier 186. In this manner, the one or more package servers 162 can be assured of distributing the most current or correct package update 150 to the one or more clients 102, based on their most recent package profile or machine state.

In aspects, the one or more package servers 162 can perform other network management operations besides package updates on one or more clients 102 based on the encoded identifier 186 and other data associated with the set of installed packages 112 on those machines. For instance, in aspects, the administrator or other user of managed network 100 may wish to inventory and identify all of the one or more client machines 102 having a precisely equal encoded identifier 186. This may permit, for instance, the identification and/or grouping of machines containing an identical set of package and/or file images, since the likelihood of any two machines randomly containing the same packages and/or files without representing the same instance or image of a machine, whether physical or virtual, is low. The one or more package servers 162 can thereby perform a discovery process on managed network 100, and can in embodiments locate one or more clients 102 to group or configure into a related set of targets, for instance to define a class of clients or workstations grouped for a specific engineering, financial, and/or other technical or other task. Other management actions can be performed on the one or more clients.

FIG. 3 illustrates an exemplary data storage structure for a package cache record 182 that can for instance be stored and maintained by the one or more package servers 162, according to various aspects of the present teachings. In aspects, the package cache record 162 can contain information related to the set of installed packages 112 hosted in a group of the one or more clients 102 in the managed network 100. The package cache record 182 can for instance be stored in a package cache 180 such as electronic memory accessed, stored in, and/or hosted by the one or more package servers 162, themselves. In aspects, the package cache 180 can also or instead be or include other electronic memory, and/or other memory having relatively fast access times and/or low latencies, and available to the one or more package servers 162.

In aspects as shown, the package cache record 182 can encode and store information that can be keyed on a field identifying one or more clients 102 by a machine ID, such as a serial number media access control (MAC) address, and/or other address or identifier. In aspects, the package cache record 182 can store an encoded identifier 186 of the set of installed packages 112 for each host or client in the one or more clients 102 which is recorded in the package cache record 182. As described herein, the encoded identifier 186 received from each individual machine in one or more machines can be encoded from the set of package attributes 114 for each of the set of installed packages 112, and/or the set of component files 158 contained with those packages. The package cache record 182 can likewise store a set of additional attributes or data associated with each of the one or more clients 102 and their associated set of installed packages 112, including, merely illustratively, the installation date/time, package size, installation location such as directory or library location, and a field indicating whether a package update has been scheduled for each machine.

The package cache record 182 can furthermore store a record of any package update notification 188 received from a given host or client, indicating to the one or more package servers 162 that the subject machine has undergone an update to the set of installed packages 112 since the last encoded identifier 186 has been received and stored to the package cache record 182. In aspects, the one or more package servers 162 and/or other logic can schedule individual machines having a package update notification 188 to be interrogated to inventory their package complements, and generate an updated encoded identifier 186. In aspects, the one or more package servers 162 and/or other logic can schedule the machines having a package update notification 188 at different times and/or the same times, and/or based on different criteria of conditions. For example, the one or more package servers 162 and/or other logic can collect a list of those machines for whom a package update notification 188 has been received, and request an updated encoded identifier 186 from those machines at or around the time that a package update for those and/or other machines is scheduled. In such cases, the one or more package servers 162 and/or other can be assured that the encoded identifier 186 for all the machines under management in the one or more clients 102 is accurately reflected and up-to-date in the package cache record 182, and that package update operations can therefore take place based on the correct package complements. In aspects, the updating of the one or more clients 102 for which a package update notification 188 has been received can be performed at other times, such as, for example, during overnight or other off-peak periods in managed network 100, so that a greater amount of bandwidth is available to distribute the package updates 150 to those machines. Other times, conditions, and/or criteria for carrying out the distribution of any package updates 150 can be used.

In addition to fields reflecting the encoded identifier 186, machine ID 184, and a record of the package update notification 188, the package cache record 182 can likewise store other information related to the package complement and machine state for the one or more clients 102, including, for instance, an indication of the execution state, executing processes, and/or user authorizations for those machines. Other data, fields, identifiers, attributes, commands, and/or other information can be included in the package cache record 182.

Figure 4:
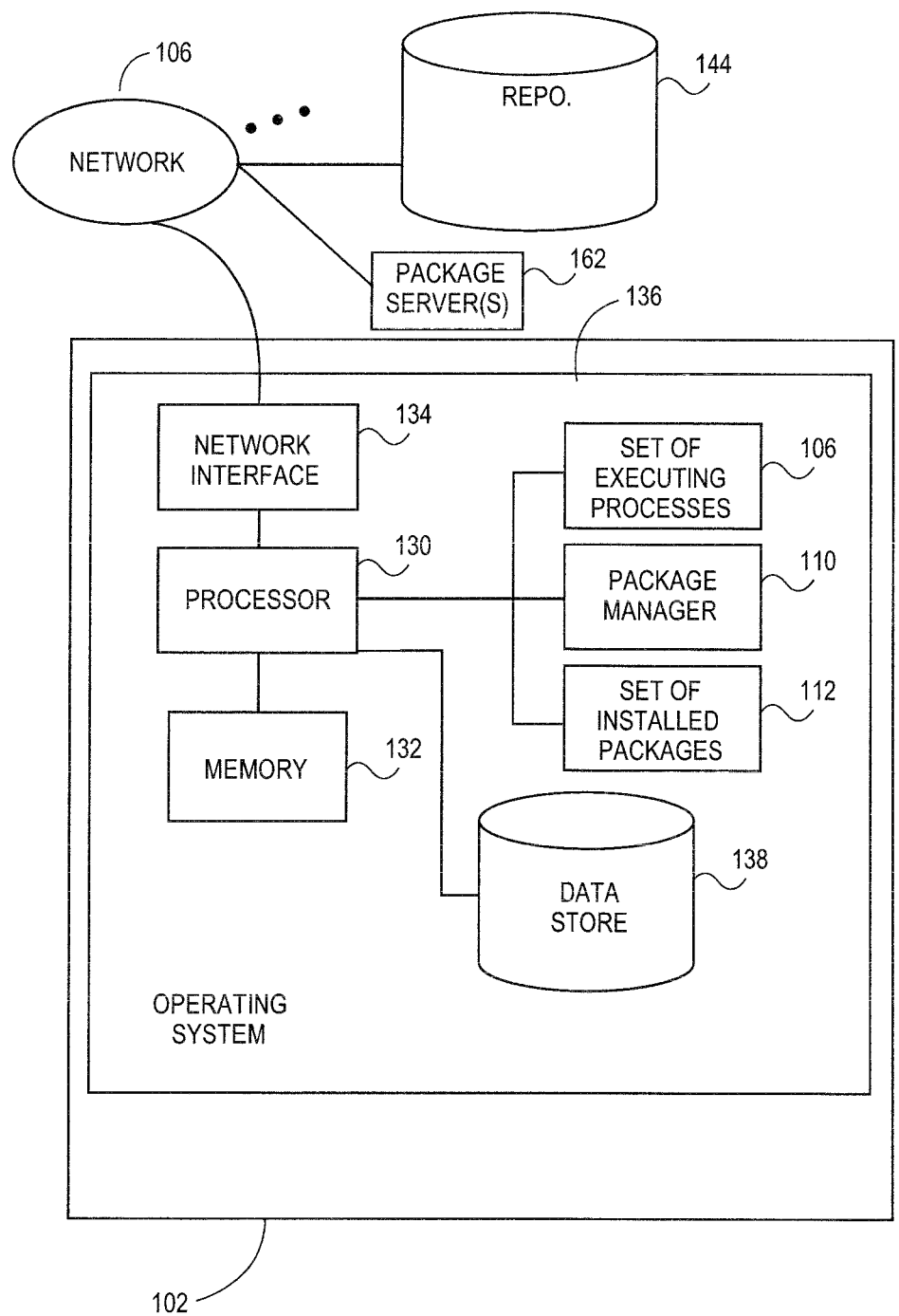
FIG. 4 illustrates exemplary hardware and other resources of a client machine that can be used in systems and methods generating cached representations of an encoded package profile, according to various embodiments.

FIG. 4 illustrates an exemplary diagram of hardware and other resources that can be incorporated in any one of the one or more package servers 162 to manage, encode, cache, and configure information related to the set of installed packages 112 and other resources the on one or more clients 102, according to embodiments. In embodiments as shown, each of the one or more package servers 162 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. The processor 130 also communicates with a management module 128 which can comprise applications, software, and/or logic to perform package management activity, as well as data store 138, such as a database stored on a local hard drive. The processor 130 further can communicate with a network interface 134, such as an Ethernet or wireless data connection, which in turn communicates with one or more networks 106, such as the Internet or other public or private networks. The processor 130 also communicates with one or more clients 102 via the network interface 134 and the one or more networks 106, including the package manager 110 hosted on each machine of one or more clients 102. The processor 130 of each of the one or more package servers 162 can also communicate with other resources to execute control logic and control the inventorying, encoding, caching, updating, installation, and management of software packages and updates to those packages on those machines and their associated processes. Other configurations of the one or more packager servers 162, including processor and memory resources, associated network connections, and other hardware and software resources are possible. It may be noted that in embodiments, each of one or more clients 102 can contain the same or similar hardware, software, communications, and/or other resources as the one or more package servers 162.

Figure 5:
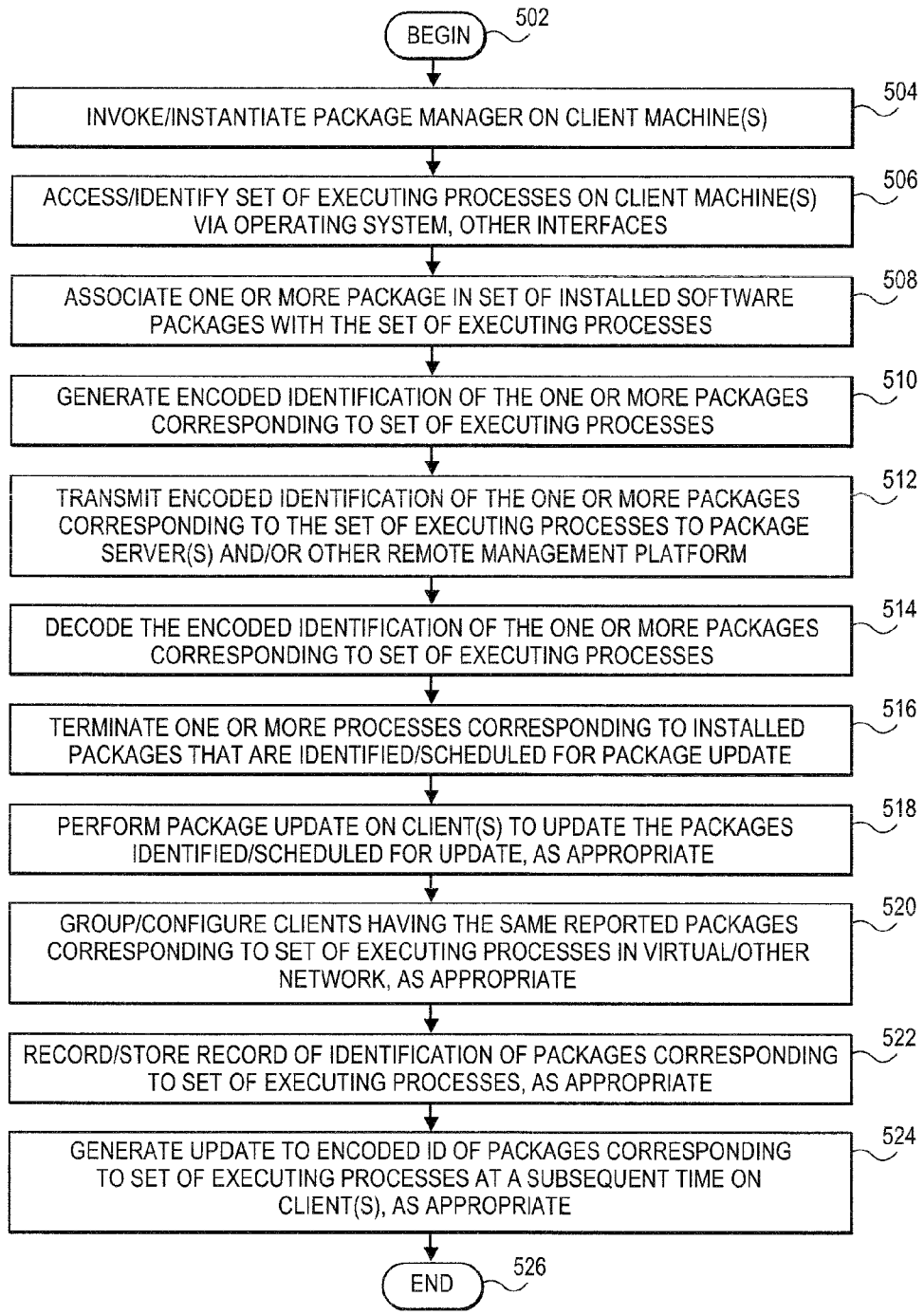
FIG. 5 illustrates a flowchart of processing for package inventorying, analysis, encoding, and storing of package identifiers and other data that can be used in systems and methods for generating cached representations of an encoded package profile, according to various embodiments.

FIG. 5 illustrates overall processing to track, monitor, and manage software packages, component files of those packages, and perform other management activity including to generate an encoded identification of installed packages and build a package cache of that identification data, according to various embodiments. In 502, processing can begin. In 504, a user can invoke or instantiate the package manager 110 on one or more clients 102 to perform inventory, maintenance, updating, encoding, and other activity. In 506, the inventory processing and detection of the set of installed packages 112, the set of component files 158 of those packages, and/or other files, attributes, or objects hosted on the one or more clients 102 can be initiated. In aspects, the inventory and related processing can be initiated by a user of the one or more clients 102 via the package manager 110 and/or other logic. In aspects, the inventory and related processing can be initiated automatically by an application or service, for instance, by a management service communicating with the one or more clients 102 to perform an inventory of the total package/file complements on those machines on a periodic, event-triggered, and/or other basis. In aspects, automatic inventories or census checks can be run on the set of installed software packages 112, the set of component files 158, and/or other data or objects of the one or more clients 102 in connection with package update activities, or can be performed independently of package update activities.

In 508, the package manager 110 of one or more clients 102 can generate the encoded identifier 186 of the set of installed packages 112 for each respective client or host. In aspects, the encoded identifier 186 can comprise an output or object generated using a hash function operating on text, strings, or other data reflecting one or more attributes in the set of package attributes 114. In cases where a hash function or hash operator is used, the hash function can be or include SHA1 (Secure Hash Algorithm 1), SHA2 (Secure Hash Algorithm 2), SHA3 (Secure Hash Algorithm 3), and/or other hash functions, operators or routines. In aspects, the encoded identifier 186 need not be based on a hash function, but can in addition or instead be based on other classes of functions or algorithms.

In 510, the package manager 110 and/or other logic can transmit the encoded identifier 186 of the set of installed packages 112 to the one or more package servers 162 and/or other remote management platform(s). In 512, the one or more package servers 162 and/or other remote management platform(s) can receive and decode the encoded identifier 186, such as performing a lookup against a hash table, and/or performing other processing or decoding. In 514, the one or more package servers 162 can order and/or store the encoded identifier 186, the machine ID 184, the package update notification 188, and/or other information related to the set of installed packages 112 in the package cache record 182 of the one or more package servers 162. The package cache record 182 can, for instance, be stored in the package cache 180 of the one or more package servers 162, such as, for example, a local high-speed electronic memory, and/or other memory or data store. In 516, the one or more package servers 162 can identify and/or group the data related to the one or more clients 102 in the package cache record 182 based on the set of installed packages 112 as decoded by the one or more package servers 162 and/or other logic. For instance, in embodiments as illustratively shown in FIG. 3, machines having an identical complement of set of installed packages 112 (and/or set of component files 158), and a resulting identical encoded identifier 186, can be grouped or listed together in the package cache record 182, since they in one regard can represent images of identically-configured machines.

In 518, the one or more package servers 162 and/or other remote management platforms or logic can generate a package update 150, and/or other management processes, commands, and/or functions based on the package information contained in the package cache record 182. In aspects, the package update 150 and/or other commands or data can be transmitted via a secure channel and/or in an encoded format. In 520, the one or more package servers 162 can receive a package update notification 188 from the one or more clients, as appropriate. For instance, the one or more clients 102 can be configured to automatically generate a package update notification 188 at any time the set of installed packages 112 has been updated or changed. In aspects, the package update notification 188 can be generated at other times, and/or based on other conditions or criteria. In 522, the one or more package servers 162 and/or other remote management platform or logic can receive an updated version of the encoded identifier 186 for the one or more client machines 102. In aspects, the one or more package servers 162 and/or other remote management platform or logic can receive an updated version of the encoded identifier 186 for all of the one or more client machines 102. In aspects, the one or more package servers 162 and/or other remote management platform or logic can receive an updated version of the encoded identifier 186 for a subset of the one or more client machines 102, which can be or include only those machines reporting or transmitting a package notification update 188. In aspects, the updated version of the encoded identifier 186 can be generated based on scheduling or conditions detected or processed by the package manager 110 of the one or more clients themselves. In aspects, the updated version of the encoded identifier 186 can also or instead be generated based on a command or other data transmitted from the one or more package servers 162 to the one or more clients 102, on a demand-pull or interrogation basis.

In 524, the one or more package servers 162 and/or other remote management platform or logic can interrogate, extract, and/or receive the updated version of the encoded identifier 186 from the one or more clients 102 based on the transmission of package server commands, and/or other remote management activity. In 526, the one or more package servers 162 and/or other remote management platform or logic can update the package cache record 182 in package cache 180, as appropriate. In 528, as understood by persons skilled in the art, processing can return to a prior processing point, jump to a further processing point, or end.

The foregoing description is illustrative, and variations in configuration and implementation may occur to persons skilled in the art. For example, while embodiments have been described in which a unitary package manager 110 locally installed one each machine in one or more clients 102 is configured to control package update activity including the encoding and reporting of an encoded identification 166, in embodiments, multiple applications or software can interact to control the downloading, installation, testing, and other management of software packages. For further example, while embodiments have been described in which package update activity is conducted on one client of a set of one or more clients 102, in embodiments, multiple local or remote targets, clients, and/or other machines can register to package manager 110 and/or other logic or resources to receive or perform package inventory, update, and/or management activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A computer-implemented method, comprising:
    receiving, by a server from a host machine, an encoded identification of a set of installed packages on the host machine, the encoded identification being generated by encoding a set of attributes of the set of installed packages on the host machine;
    entering the encoded identification into a package cache record maintained by a remote management platform, the package cache record comprising a plurality of encoded identifications of a plurality of host machines;
    generating a target group in view of at least a portion of the plurality of host machines that each comprise a matching encoded identification for their respective set of installed packages; and
    generating, by the server, a remote management command to transmit to the target group, wherein the remote management command comprises a command to initiate a package update on each of the plurality of host machines in the target group.

2. The method of claim 1, wherein the encoded identification is captured by a local package manager installed on the host machine.

3. The method of claim 1, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

4. The method of claim 3, wherein the encoded identification is generated by applying a hash function to the set of attributes of the set of installed packages.

5. The method of claim 1, wherein the set of installed packages comprises at least one of a set of installed packages or a set of component files associated with the set of installed packages.

6. The method of claim 1, further comprising receiving a package update notification in the remote management platform when a package update is installed in the host machine.

7. The method of claim 6, further comprising receiving an updated encoded identification of the set of installed packages in the remote management platform in response to the package update notification.

8. The method of claim 7, further comprising replacing the encoded identification stored in the package cache record with the updated encoded identification.

9. The method of claim 7, wherein the updated encoded identification is generated in view of a set of predetermined criteria.

10. The method of claim 9, wherein the set of predetermined criteria comprises a predetermined update schedule.

11. The method of claim 1, wherein the host machine comprises a virtual machine.

12. The method of claim 11, wherein the virtual machine is hosted in a cloud-based network.

13. The method of claim 1, wherein the host machine comprises a hardware-based machine.

14. The method of claim 1, wherein the package cache record comprises a record stored in an electronic memory in the remote management platform to store a cached representation of package information associated with host machine.

15. The method of claim 14, further comprising storing the package cache record to a long-term data store of the remote management platform.

16. The method of claim 1, wherein the remote management platform comprises at least one of one package server or one network management platform.

17. A system, comprising:
    a network interface to a host machine; and
    a processor, to communicate with the host machine via the network interface, the processor to:
        receive, from the host machine, an encoded identification of a set of installed packages on the host machine, the encoded identification being generated by encoding a set of attributes of the set of installed packages on the host machine,
        enter the encoded identification into a package cache record maintained by a management platform, the package cache record comprising a plurality of encoded identifications of a plurality of host machines,
        generate a target group in view of at least a portion of the plurality of host machines that each comprise a matching encoded identification for their respective set of installed packages, and
        generate a command to initiate an operation on the target group, wherein the operation comprises a command to initiate a package update on each of the plurality of host machines in the target group.

18. The system of claim 17, wherein the encoded identification is captured by a local package manager installed on the host machine.

19. The system of claim 17, wherein the host machine comprises at least one of a virtual machine or a hardware-based machine.

20. The method of claim 1, wherein the package cache record is located within the server.

21. A non-transitory computer readable storage medium including instructions that, when executed by a processor, cause the processor to perform operations comprising:
  receiving an encoded identification of a set of installed packages on a host machine, the encoded identification being generated by encoding a set of attributes of the set of installed packages on the host machine;
  entering the encoded identification into a package cache record maintained by a remote management platform, the package cache record comprising a plurality of encoded identifications of a plurality of host machines
  generating a target group in view of at least a portion of the plurality of host machines that each comprise a matching encoded identification for their respective set of installed packages; and
  generating, by the processor, a remote management command to transmit to the target group, wherein the remote management command comprises a command to initiate a package update on each of the plurality of host machines in the target group.

* * * * *